United States Patent [19]

Takayama

[11] Patent Number: 5,446,598
[45] Date of Patent: Aug. 29, 1995

[54] SIGNAL PROCESSING APPARATUS

[75] Inventor: Makoto Takayama, Kanagawa, Japan

[73] Assignee: Canon Kabushiki Kaisha, Tokyo, Japan

[21] Appl. No.: 313,408

[22] Filed: Sep. 27, 1994

Related U.S. Application Data

[63] Continuation of Ser. No. 809,204, Dec. 13, 1991, which is a continuation of Ser. No. 698,357, May 7, 1991, which is a continuation of Ser. No. 223,519, Jul. 25, 1988.

[30] Foreign Application Priority Data

Jul. 31, 1987 [JP] Japan .................................. 62-191873

[51] Int. Cl.$^6$ ................................................ G11B 5/09
[52] U.S. Cl. ............................................ 360/32; 366/24
[58] Field of Search ........................................ 360/32, 24

[56] References Cited

U.S. PATENT DOCUMENTS 4,406,001  9/1983  Klasco et al. ............................ 360/8
4,763,207  8/1988  Podalak et al. .......................... 360/32

OTHER PUBLICATIONS

"Electronics Designers'Handbook" by Landee et al.

Primary Examiner—Vincent P. Canney
Attorney, Agent, or Firm—Robin, Blecker, Daley & Driscoll

[57] ABSTRACT

A signal processing apparatus for recording an audio input signal on a recording medium by time base compressing the signal or reproducing the signal from the recording medium is arranged to limit the high band of the audio input signal before compressing the time base thereof and to control the low band cut-off frequency or the degree of suppressing the low band of the signal according to the high band cut-off frequency thereof.

35 Claims, 11 Drawing Sheets

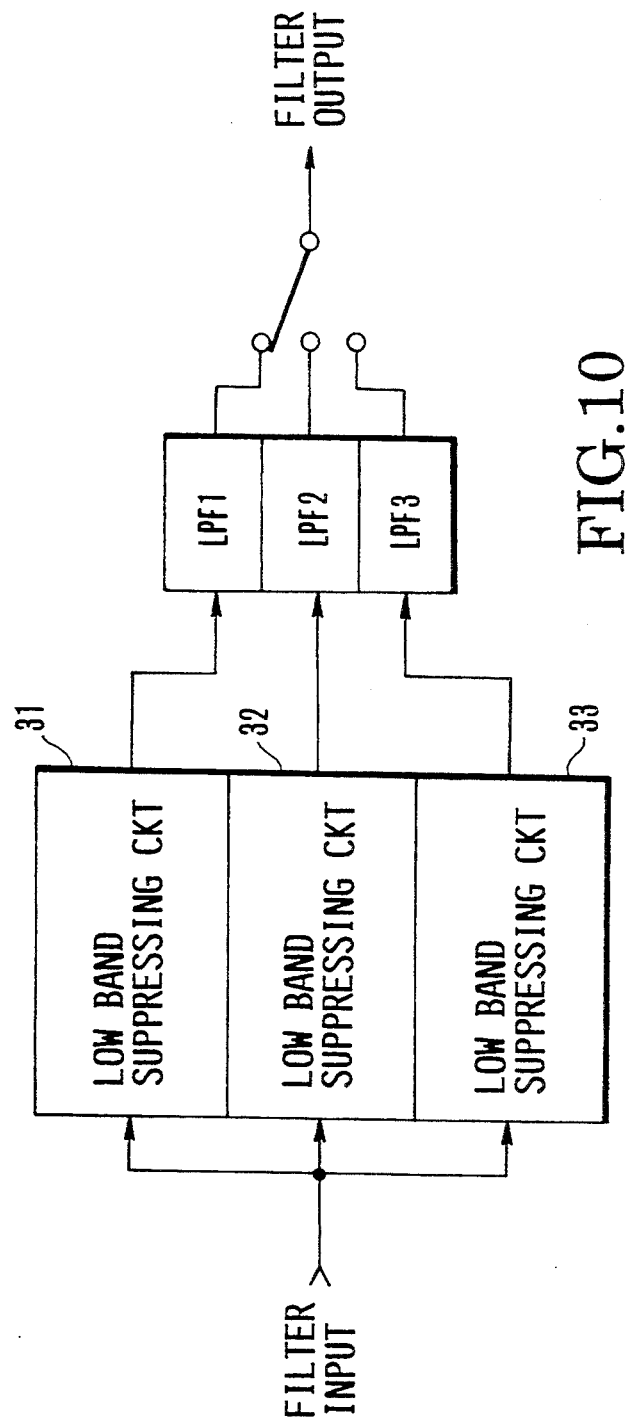

SIGNAL PROCESSING APPARATUS

This is a continuation under 37 CFR 1.62 of prior application Ser. No. 07/809,204, filed Dec. 13, 1991, now pending which is a continuation of application Ser. No. 07/698,357 filed May 7, 1991, abandoned, which is a continuation of application Ser. No. 07/223,519, filed Jul. 25, 1988, abandoned.

BACKGROUND OF THE INVENTION

Field of the Invention

This invention relates to a signal processing apparatus which records an input signal on a recording medium by limiting the frequency band of the input signal or reproduces the recorded signal from the recording medium.

Description of the Related Art

An electronic camera which is arranged to record an image signal obtained by converting an optical image into an electrical signal by image sensing means such as a CCD or the like in recording tracks on a recording medium called a video floppy disc has been proposed during recent years. The electronic camera is speedily becoming popular on account of that: Unlike the conventional silver-halide type camera, images taken by the electronic camera can be immediately reproduced by means of a monitor or the like and can be printed out or transmitted without recourse to a development process, a printing process, etc.

Specifications for the format of the electronic camera have been standardized by the Electronic Still Camera Conference. According to the standardized format, an audio signal is required to be time-base compressed before it is recorded in recording tracks on a video floppy disc like an image signal. With regard to the recorded sound time of the audio signal, the standards provide for three different sound recording modes including about 5 sec, 10 sec and 20 sec per track which are actual periods of time of the picked-up sounds. Any of these modes is selectable. The audio signal is recordable in recording tracks, like the image signal, on a video floppy disc with the time base compression rate changed according to the above stated sound recording mode selected.

Techniques for recording and reproducing audio signals of this kind have been known, for example, from U.S. patent applications Ser. No. 863,605 and 864,149, etc. However, the conventional arrangement has generally employed the recorded sound time of 10 sec as a standard mode. While electronic cameras which are capable of recording an audio signal in this standard mode have been proposed, no camera that has all the above stated sound recording modes and permits selection of any of these modes as desired has appeared as yet.

Assuming that a camera is arranged to have all these three sound recording modes and to permit recording and/or reproduction in any of these modes, there arise various problems because the time base compression rate varies with the sound recording mode. The time base compression or expansion is accomplished by sampling and storing an input signal in a memory and by reading it out at varied rates. Therefore, the sampling frequency varies with the compression rate. This results in varied degrees of high band limitation imposed on the input signal for the purpose of preventing an aliasing noise. Therefore, it is necessary to have the high band limitation arranged according to the rate of time base compression before sampling. Such arrangement would permit adequate recording and reproduction by changing the time base compression rate according to the sound recording mode.

However, recording and reproduction with a great difference in the high band cut-off frequency would bring about a great difference in the auditory sensation, or sound quality, resulting from a difference in the frequency characteristic thereof. Therefore, such a camera necessitates some arrangement that minimizes the difference in the sound quality between the sound recording modes.

SUMMARY OF THE INVENTION

This invention is directed to the solution of the above stated problems. It is therefore an object of the invention to prevent any deterioration in auditory sensation due to the high band limitation.

To attain this object, a preferred embodiment of this invention comprises, in combination, means for time-base compressing an input signal and band limiting means for limiting the frequency band of the signal to be supplied to the time-base compressing means. The band limiting means is arranged to control a low band cut-off frequency according to a high band cut-off frequency. This enables the embodiment to remove an unnatural auditory sensation that results from a difference in frequency characteristic between signals having different time base compression rates. More specifically, for a plurality of signals having different high band cut-off frequencies due to a difference in the time base compression rate, their low band characteristics are controlled according to their high band characteristics in such a way as to prevent any sound quality deterioration from being caused by an unbalanced relation between low and high frequency bands.

It is another object of the invention to provide a recording apparatus which is capable of correcting the unevenness of sound quality in terms of auditory sensation due to uneven high-band characteristics resulting from different time base compressing rates applied to a plurality of signals. To attain that object, a preferred embodiment of the invention comprises recording means for recording an input signal on a recording medium by making the time base of the input signal variable; and limiting means for limiting the frequency band of the input signal before varying the above stated time base. The band limiting means is arranged to limit the high frequency band of the input signal and to control the low band frequency of the input signal according to the high band cut-off frequency of the input signal.

It is a further object of the invention to provide a reproducing apparatus which is capable of correcting the unevenness of sound quality in terms of auditory sensation among a plurality of signals having different time base compression rates. To attain this object, a preferred embodiment of the invention comprises reproducing means for reproducing a signal recorded on a recording medium in a state of having been time-base compressed at a given compression rate; time base expanding means for expanding the time base of the signal reproduced by the reproducing means at an expanding rate corresponding to the time base compression rate; and band limiting means for limiting the band of the signal which is time base expanded by the time base expanding means. The band limiting means is arranged to change the high band cut-off frequency of the signal according to the expanding rate of the time base expanding means and to control the low band frequency characteristic of the signal according to the high band cut-off frequency.

It is a further object of the invention to provide a signal processing apparatus which has a signal system for sampling an input signal at a given frequency and is capable of correcting sound quality deterioration in terms of auditory sensation due to uneven frequency bands resulting from a difference in sampling frequency between a plurality of signals having different sampling frequencies. This apparatus comprises sampling means for sampling an input signal at a given frequency; and band limiting means for limiting, prior to sampling the frequency band of the input signal according to the sampling frequency of the sampling means. The band limiting means is arranged to control the high band cut-off frequency of the input signal according to the sampling frequency and to control the low band frequency characteristic of the signal according to the high band cut-off frequency.

A further object of the invention is to provide a signal recording/reproducing apparatus which has the same operating advantage as the above stated embodiment.

A still further object of the invention is to provide a signal processing apparatus which varies the low band characteristic of an input signal according to the high band characteristic thereof and is capable of producing a signal which is well balanced over the whole frequency band thereof.

Other objects and features of the invention will become apparent from the following detailed description thereof with reference to the accompanying drawings.

BRIEF DESCRIPTION OF THE DRAWINGS

FIGS. 10 and 11 are a block diagram and a frequency characteristic graph showing a band limiting means as a fourth improved embodiment.

DETAILED DESCRIPTION OF THE PREFERRED EMBODIMENTS

Figure 1:
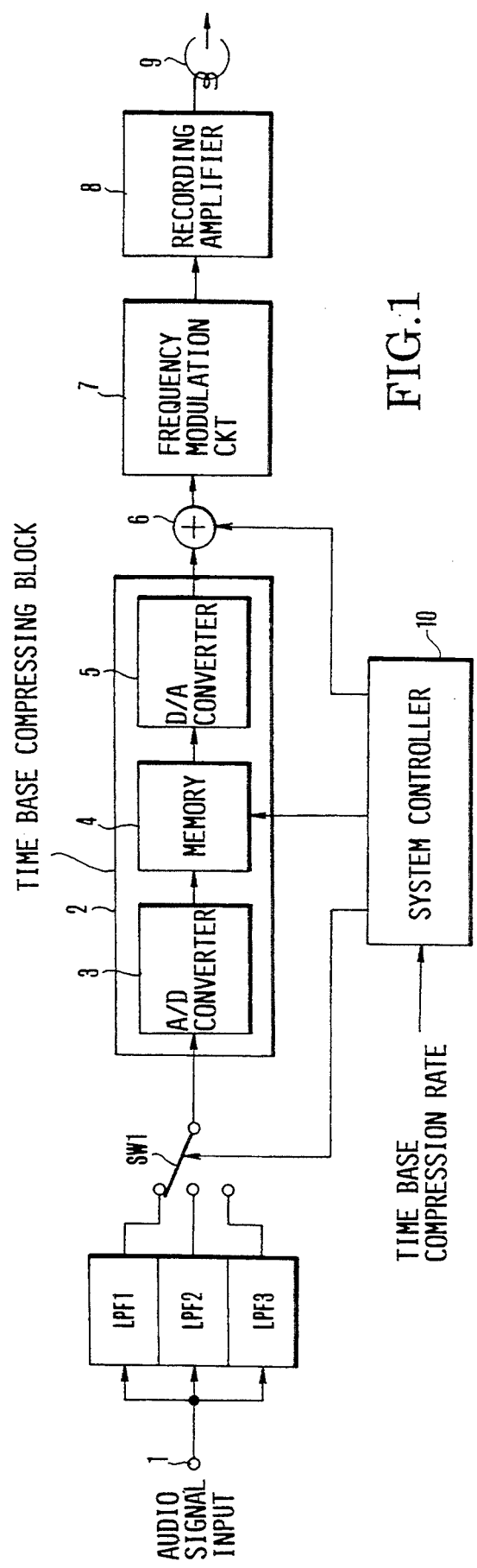
FIGS. 1 and 2 are block diagrams showing the recording and reproducing systems disposed within a signal processing apparatus as in a stage preceding an arrangement for attaining the object of this invention.
Figure 2:
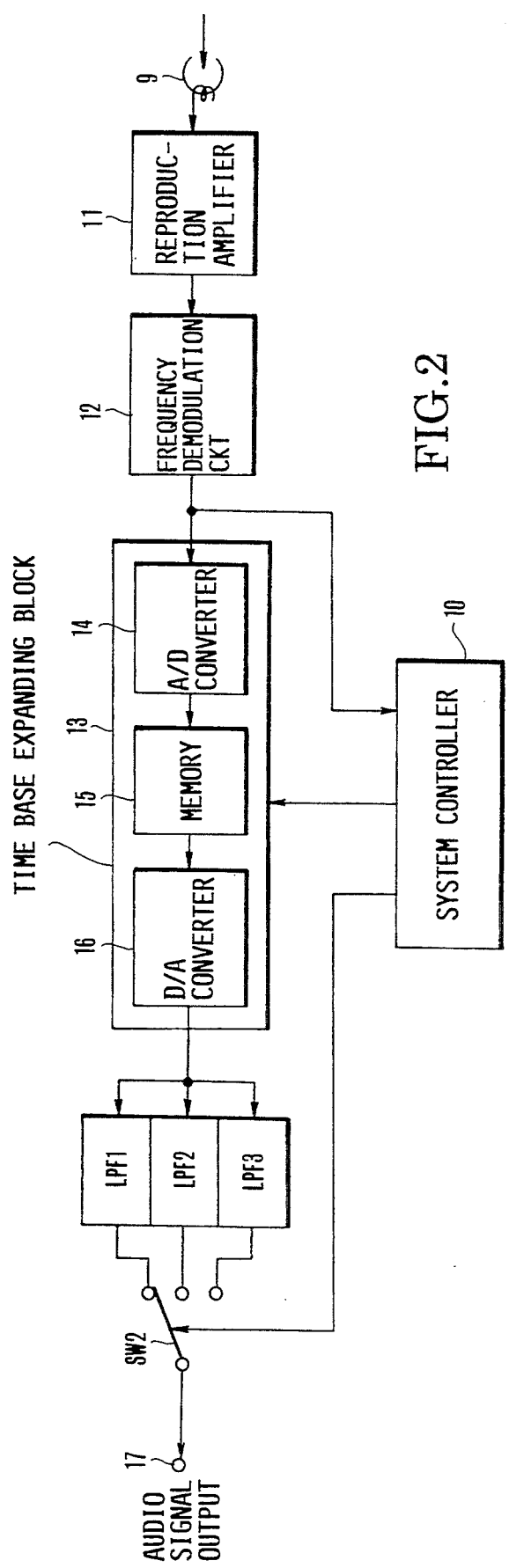
Figure 3:
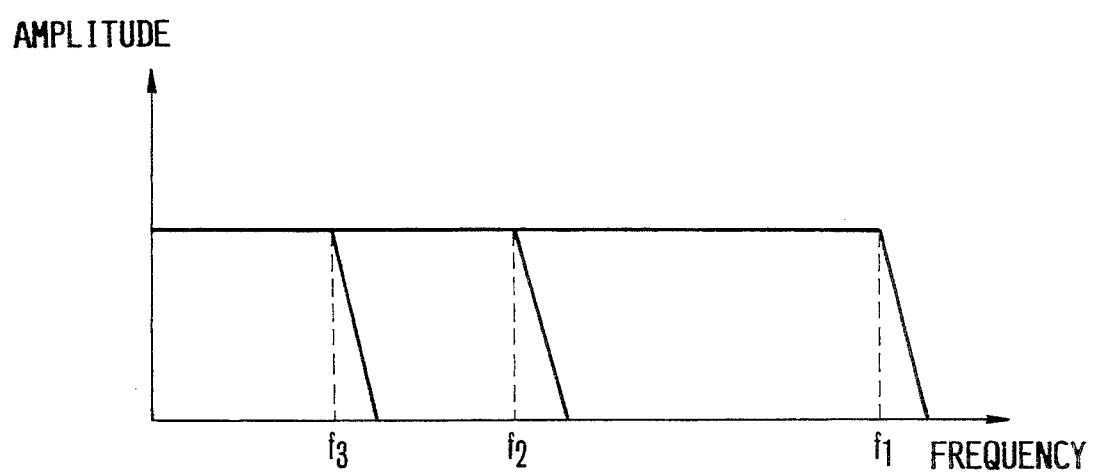
FIG. 3 is an illustration of the frequency characteristic of a low-pass filter used for a high band limiting purpose within the apparatus of FIGS. 1 and 2.

The following description shows the details of the signal processing apparatus arranged according to this invention through embodiments thereof shown in the accompanying drawings:

FIGS. 1 to 3 show the fundamental arrangement of audio recording and reproducing systems of an audio recording/reproducing apparatus to which this invention is to be applied. FIG. 1 is a block diagram showing the audio recording system. FIG. 2 is a block diagram showing the audio reproducing system. FIG. 3 is a graph showing the characteristic of a high band limiting filter included in the recording and reproducing systems.

Referring to FIG. 1, an audio signal is supplied to an audio signal input terminal 1 by means of, for example, a microphone or the like. The audio signal is supplied to low-pass filters LPF1 to LPF3 which have different cut-off frequencies. The audio signal is high band limited to a given frequency band by these low-pass filters. The input audio signal is to be sampled as will be described later for the purpose of compressing its time base. In sampling, if the input signal includes a frequency component exceeding $\frac{1}{2}$ of the sampling frequency, there arises some aliasing noise according to a known rule of sampling. In view of this, a frequency component of the audio signal input exceeding $\frac{1}{2}$ of the sampling frequency is arranged to be removed by limiting the high band of the frequency band of the input.

The time base compression rate of the audio signal varies accordingly as the recorded sound time varies for the modes of 5 sec/track, 10 sec/track or 20 sec/track. The actual sampling time thus varies accordingly. Therefore, the low-pass filters LPF1 to LPF3 are arranged to have different limiting bands accordingly for the different modes. In other words, the low-pass filters LPF1 to LPF3 are band limiting low-pass filters corresponding to the modes of 5 sec/track, 10 sec/track and 20 sec/track, respectively. The actual recorded sound lengths of time of 5 sec/track, 10 sec/track and 20 sec/track correspond respectively to the compression rates of 320 times, 640 times and 1280 times in the case of the NTSC TV system (277 times, 544 times and 1088 times in the PAL system). The compression rate increases accordingly as the actual period of time of the picked-up sound increases. The frequency band of an actually recordable audio signal is as follows: Assuming that a luminance signal of frequencies, for example, up to 3 MHz is recordable, the frequency band, i.e., the high band cut-off frequencies for the compression rates of 320 times (5 sec/track), 640 times (10 sec/track) and 1280 times (20 sec/track) become about 10 KHz, 5 KHz and 2.5 KHz respectively.

The apparatus is thus arranged to perform a band limiting action on the audio signal input according to the frequency band thereof before compressing the time base of the input signal. Therefore, the audio signal coming via the input terminal 1 is supplied to the low-pass filters LPF1 to LPF3. Then, one of them having a limiting band corresponding to the recorded sound time, i.e., the time base compression rate of the input signal is selected by means of a switch SW1. The switch SW1 performs its selecting action according to the applicable mode under the control of a system controller 10.

The audio signal input which has been band limited through the low-pass filter (LPF) selected by the switch SW1 is supplied to a time base compressing block 2. The block 2 then performs a time base compressing action according to the sound recording mode which is selected together with the position of the switch SW1.

The time base compressing block 2 consists of an A/D converter 3 which is arranged to convert the analog input audio signal into a digital signal at a given rate; a memory 4 for storing the digital signal data obtained by the converting action of the A/D converter 3; and a D/A converter 5 which is arranged to read out, at a rate (speed) corresponding to the time base compression rate, the digital signal data stored at the memory 4 and to convert it into an analog signal. The time base compressing block 2 is thus arranged to perform the time base compressing action according to each of the sound recording modes by changing the reading rate in reading out the data from the memory 4 for D/A conversion under the control of the system controller 10.

The audio signal which is converted into an analog signal by the D/A converter 5 is supplied to an adder 6. At the adder 6, a control code which includes a discrimination code for the time base compression rate, etc. and other control information of varied kinds are added to the audio signal. The output of the adder 6 is supplied to a frequency modulation circuit 7 to be frequency modulated there. The frequency modulated signal thus obtained is amplified up to a given level via a recording amplifier 8. The amplified signal is subjected to a given equalizing process, etc. before it is recorded by a magnetic head 9 on a video floppy disc which is not shown.

The system controller 10 is arranged to control the operations of the whole apparatus. The controller 10 comprises a CPU, a ROM which has a control program stored therein beforehand, a RAM which is provided for various computing operations, and an input/output interface I/O which is provided for exchange of control signals between circuit blocks. In the case of this embodiment, the system controller 10 controls the selecting operation of the filter selecting switch SW1 according to the sound recording mode (time base compression rate) selected by the operator. Under the control of the controller 10, one of the low-pass filters LPF1 to LPF3 having a cut-off frequency corresponding to the time base compression rate of the mode is selected. At the same time, the time base compression rate is set by controlling the reading speed (rate) at which the stored data is read out from the memory 4 of the time base compressing block 2 for D/A (digital-to-analog) conversion. Further, the controller 10 supplies a control code including a discrimination code indicative of the time base compression rate and other control information of varied kinds to the adder 6 in accordance with a given format.

FIG. 3 shows the frequency characteristics of the low-pass filters LPF1 to LPF3. As mentioned in the foregoing, the time base compression rate becomes 320, 640 or 1280 times according to the actual periods of time of the picked-up sounds, i.e., 5 sec, 10 sec or 20 sec. Then, the frequency band recordable on the recording medium becomes 10 KHz, 5 KHz or 2.5 KHz. Therefore, with the band limiting low-pass filters LPF1 to LPF3 which have the cut-off frequencies f1, f2 and f3 respectively provided for these modes, the cut-off frequencies f1, f2 and f3 can be set at about 10 KHz, 5 KHz and 2.5 KHz. In this instance, the sampling frequency in compressing the time base is of course set at a value which is at least two times as high as the cut-off frequency in each of the modes for the purpose of preventing the aliasing noise.

FIG. 2 is a block diagram showing the audio reproduction system of the apparatus. With an audio signal reproduced by a magnetic head 9 from a video floppy disc which is not shown, the reproduced audio signal is amplified to a given level by a reproduction amplifier 11. The amplified signal is supplied to a frequency demodulation circuit 12 to be demodulated there.

The demodulated signal is supplied to a time base expanding block 13. The signal is A/D (analog-to-digital) converted by an A/D converter 14. The converted signal data is stored by a memory 15. The signal data is then read out from the memory 15 at an expansion rate which corresponds to the time base compression rate used in recording. The read out signal data is supplied to a D/A converter 16 to be converted into the analog audio signal having the original time base. The analog signal is in a state of having been amplitude modulated by a clock signal frequency through the D/A conversion. The clock signal component is, therefore, removed by passing the analog signal through low-pass filters LPF1 to LPF3. After that, the analog signal is supplied to an audio signal output terminal 17.

The output of the frequency demodulation circuit 12 is supplied to the system controller 10 as well as to the time base expanding block 13. By this, the time base compression rate and other control information of varied kinds are read by the controller 10. Then, the controller 10 controls, according to the time base compression rate thus found, the reading speed at which the stored data is to be read out from the memory 15 of the time base expanding block 13, and shifts the selecting position of a switch SW2. This causes the switch SW2 to select one of the low-pass filters LPF1 to LPF3 that gives a frequency band corresponding to the sound recording mode selected.

The internal arrangement of the time base compressing block 2 and that of the time base expanding block 13 are identical with each other. Both the compressing and expanding actions can be accomplished by controlling, with the system controller 10, the speed at which data are to be read out from the memory 4 during the compressing and expanding actions. In actually designing these two blocks, therefore, they can be arranged in the form of a single time base converting circuit.

Furthermore, in accordance with the arrangement of the time base compressing (expanding) block 2 (13), the time base is compressed (or expanded) by changing the reading rate or speed in reading out the data from the memory 4 (or 15). However, to obtain the same result, this arrangement may be changed to change the sampling frequency in sampling and writing the audio signal input into the memory in such a manner as to compress (or expand) the time base of the input, with the rate of reading the data from the memory left unchanged. Therefore, in the case of the present application, the term "sampling" means either of these two different methods.

The embodiment described is arranged to record an audio signal by time base compressing it according to the recorded sound time. In reproducing the record, the signal is expanded at an expansion rate corresponding to the time base compression rate. The signal recorded thus can be reproduced in the actual period of time of the picked-up sound. However, through further studies, the apparatus has been found to have room for further improvement as described below:

According to the results of auditory tests, audio signals which have their frequency bands limited through the high band limiting low-pass filters of the recording and reproducing systems for the purpose of preventing the aliasing noise present the following problem: Although their high bands are limited according to the time base compression rate, they have been found to have their low bands elongated alike. They give an auditory sensation as if it is resulting from a particularly high rate of compression and an emphasized cut-off frequency. The auditory sensation varies and the sound quality changes according to changes in the compression rate. In short, they give an unnatural auditory sensation.

The following describes another embodiment which is arranged to improve the apparatus in this respect: In this case, a plurality of band limitations are applied to the audio signal for recording and reproducing it on and from the recording medium. The frequency characteristic of the low band of the audio signal is arranged to be variable according to the plurality of band limitations. The unnatural auditory sensation attributable to the unbalanced frequency characteristics in the sound recording modes, i.e. the modes of different time base compression rates, is removable by this arrangement.

Figure 4:
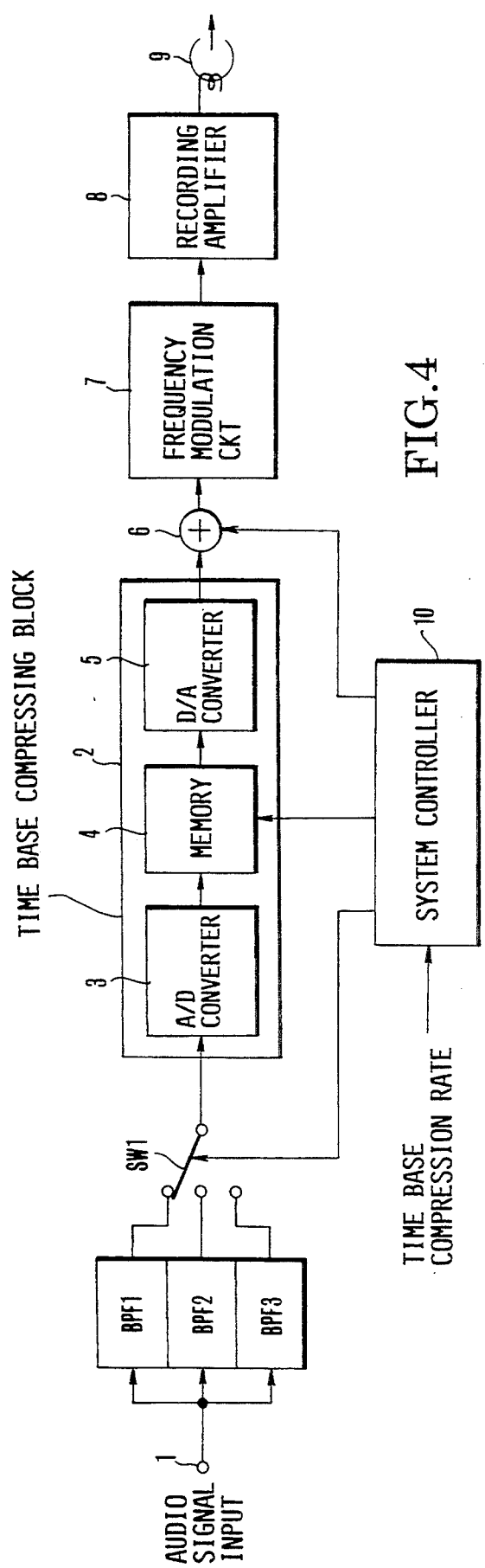
FIGS. 4 and 5 are block diagrams showing the recording and reproducing systems of a first improved embodiment of this invention which is an improvement in the apparatus of FIGS. 1 and 2.
Figure 5:
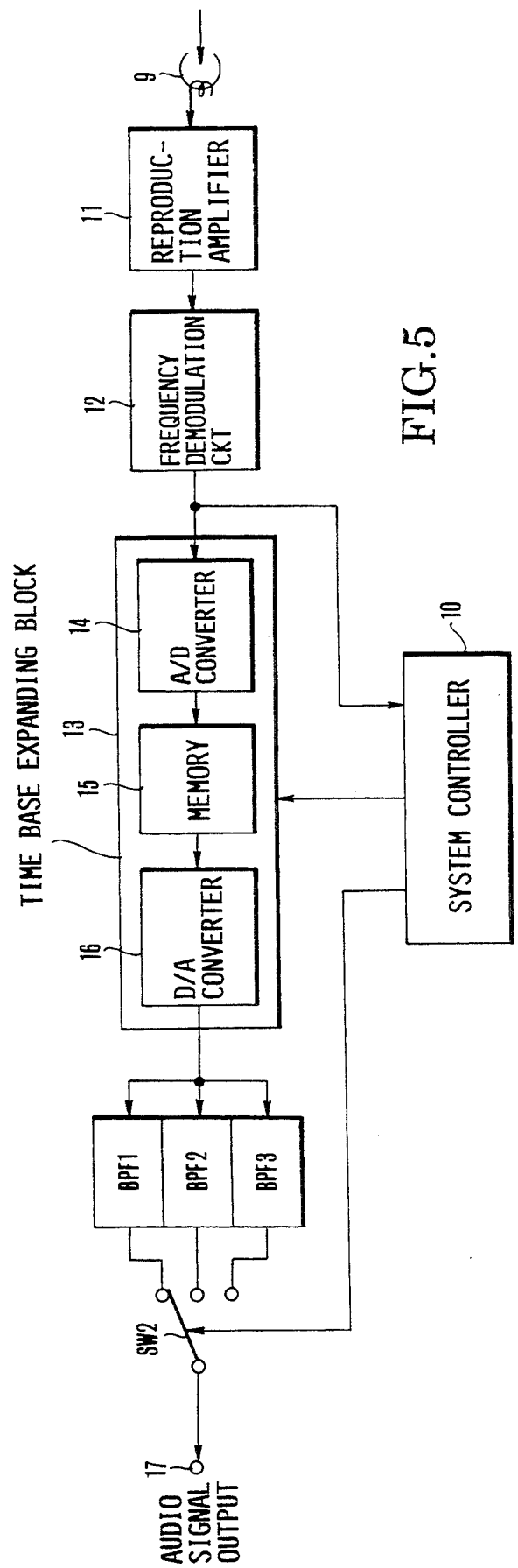

Referring to FIGS. 4 and 5, the details of this improved audio signal processing apparatus are as follows: The same components as those of the embodiment shown in FIGS. 1 and 2 are indicated by the same reference numerals and the details of them are omitted from description.

In other words, FIGS. 4 and 5 show in block diagrams the recording and reproducing systems of the audio signal processing apparatus which is arranged as a first improved embodiment of this invention. In these illustrations, a time base compressing block 2, an adder 6, a frequency modulation circuit 7, a recording amplifier 8, a reproducing head 9, a reproduction amplifier 11, a frequency demodulation circuit 12, a time base expanding block 13 and a system controller 10 are arranged in the same manner as the apparatus described in the foregoing with reference to FIGS. 1 and 2 and therefore require no further description.

Figure 6:
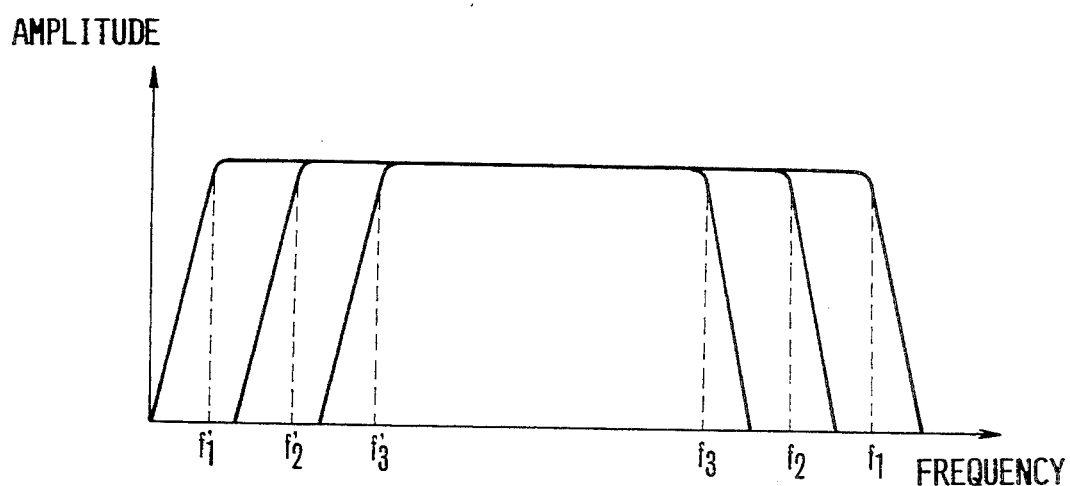
FIG. 6 shows the frequency characteristic of a band-pass filter used for the apparatus of FIGS. 4 and 5.

In the case of this embodiment, in place of the low-pass filters LPF1 to LPF3 which are inserted for the high band limiting purpose in between the audio signal input terminal 1 and the time base compressing block 2 or in between the audio signal output terminal 17 and the time base expanding block 13 as shown in FIGS. 1 and 2, there are provided band-pass filters BPF1 to BPF3 which are capable of controlling not only the high band but also the low band of the audio signal. FIG. 6 shows the frequency characteristic of these band-pass filters BPF1 to BPF3. The band-pass filter BPF1 is arranged to be selected for the mode in which the time base compression rate is 320 times (recorded sound time is 5 sec) and to have a high band cut-off frequency f1 and a low band cut-off frequency f1'. The high band cut-off frequency f1 is set at about 10 KHz which is the upper limit frequency of the mode of having the compressing rate of 320 times.

The band-pass-filter BPF2 is arranged to be selected for the mode in which the time base compression rate is 640 times (recorded sound time is 10 sec) and to have a high band cut-off frequency f2 and a low band cut-off frequency f2'. The high band cut-off frequency f2 is set at about 5 KHz which is the upper limit frequency of the mode of having the 640 times compressing rate. Another band-pass filter BPF3 is arranged to be selected for the mode in which the time base compression rate is 1280 times (recorded sound time is 20 sec) and to have a high band cut-off frequency f3 and a low band cut-off frequency f3'. The high band cut-off frequency f3 of the band-pass filter BPF3 is set at about 2.5 KHz which is the upper limit frequency of the mode of having the 1280 times compressing rate.

The low band cut-off frequencies f1', f2' and f3' of these band-pass filters BPF1 to BPF3 are arranged to be in a relation of f1'<f2'<f3'. The arrangement is such that an audio signal having a lower compression rate, that is, having the high band cut-off frequency at a higher value has the low band cut-off frequency set at a lower value. As a result, the low band is broadened for a frequency characteristic extending to a high frequency value and is suppressed to a greater degree in case that the high band is limited. This enables the apparatus to produce a well balanced audio signal of a good auditory sensation without any disagreeable auditory sensation that is inevitable when the low band is emphasized alone.

The low band cut-off frequencies f1', f2' and f3' of the band-pass filters BPF1 to BPF3 are set, for example, at about 50 Hz, 70 Hz and 100 Hz respectively. However, these values may be changed as desired.

The reproducing system of FIG. 5 is likewise arranged to frequency demodulate, through the reproduction amplifier 11, a signal reproduced from a video floppy disc. The demodulated signal is supplied to the time base expanding block 13 to be time base expanded there. Then, the time band expanded signal is supplied to the band-pass filter BPF1, BPF2 or BPF3 according to the time base compression rate or to a filter that has about the same characteristic as the band-pass filters BPF1, BPF2 or BPF3. By this, a clock signal noise, etc. resulting from the D/A conversion performed at the D/A converter 16 can be removed from the signal. The signal is then produced from the audio signal output terminal 17. Further, the internal arrangements of the time base compressing block 2 and that of the time base expanding block are identical with each other. Like in the case described in the foregoing, both the compressing and expanding actions can be accomplished with the speed (or rate) of data reading from the memory 4 for compressing and expanding the time base controlled by means of the system controller 10.

Figure 7:
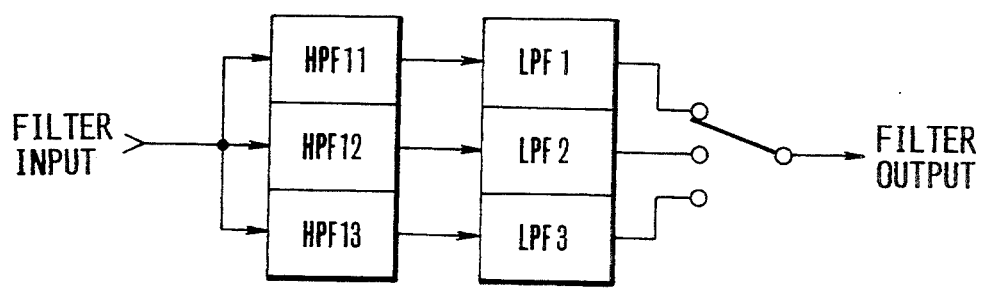
FIG. 7 is a block diagram showing band limiting means as a second improved embodiment.

FIG. 7 shows a second improved embodiment of this invention. The same advantageous effect as that of the first improved embodiment described above is attainable by replacing the band-pass filters BPF1, BPF2 and BPF3 with a series connected combination of a high-pass filter HPF11 and a low-pass filter LPF1, a series connected combination of a high-pass filter HPF12 and a low-pass filter LPF2 and another series connected combination of a high-pass filter HPF13 and a low-pass filter LPF3. With the exception of this, other parts of the second improved embodiment are similar to those of the embodiment shown in FIGS. 4 and 5.

Figure 8:
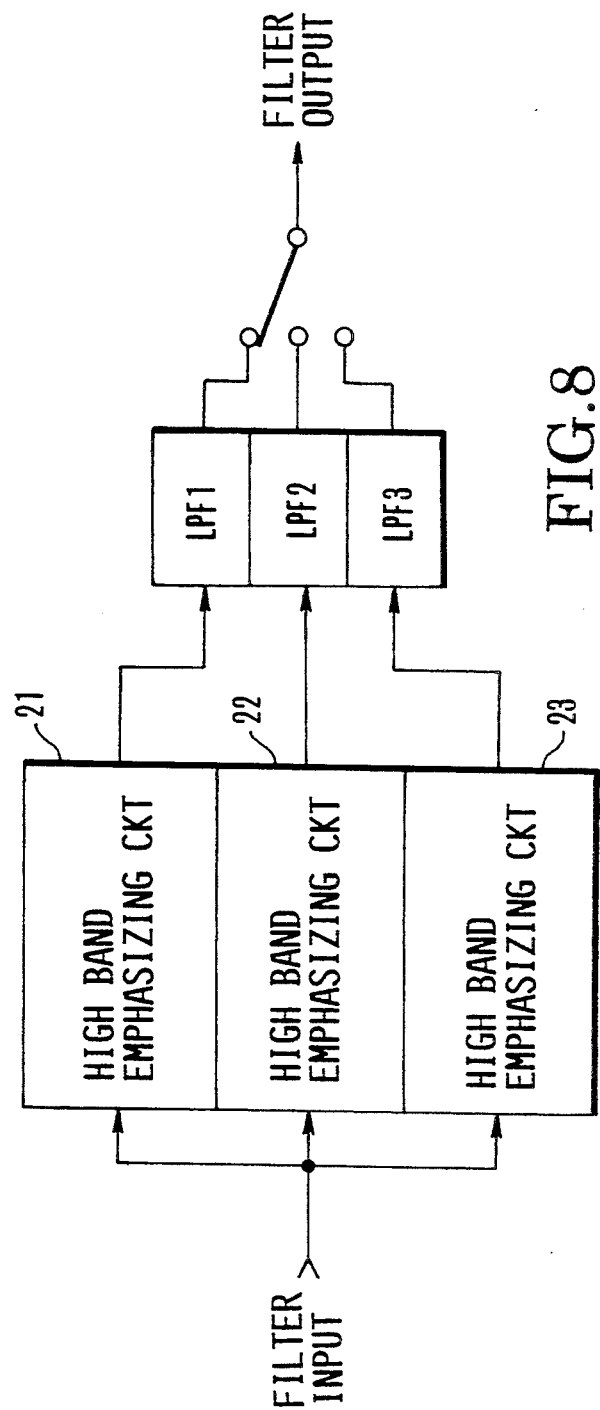
FIGS. 8 and 9 are a block diagram and a frequency characteristic graph respectively showing a band limiting means as a third improved embodiment.
Figure 9:
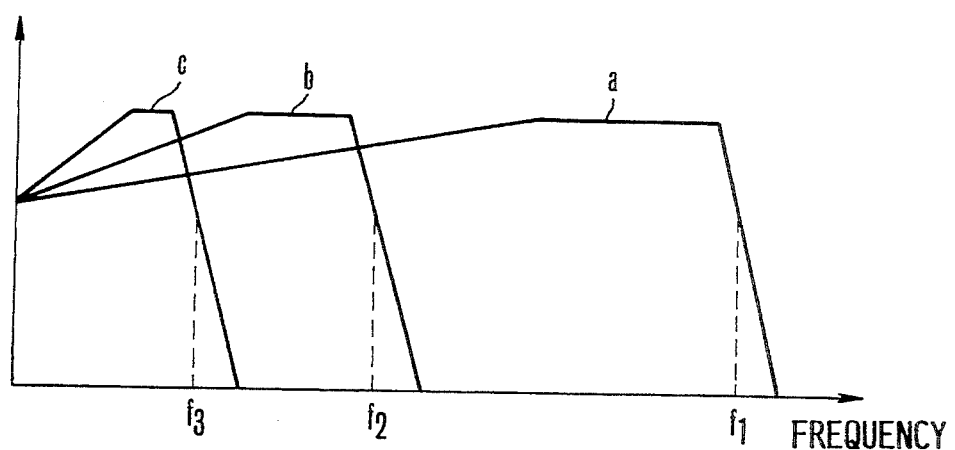

FIG. 8 shows a third improved embodiment of this invention. In this case, the band-pass filters BPF1, BPF2 and BPF3 are replaced with series circuits consisting of low-pass filters LPF1, LPF2 and LPF3 in combination respectively with high band emphasizing circuits 21, 22 and 23 which are of different frequency characteristics. The frequency characteristics of these series circuits are as shown in FIG. 9. The amplitude characteristic gradually increases upward from a low band to emphasize a high band. The cut-off frequency for a smaller time base compression rate is set at a higher band frequency, in the order of f1, f2 and f3, in the same manner as in the preceding embodiments described in the foregoing. In other words, a curve "a" shows the characteristic curve of the series circuit consisting of the high band emphasizing circuit 21 and the low-pass filter LPF1; a curve "b" that of the series circuit consisting of the high band emphasizing circuit 22 and the low-pass filter LPF2; and another curve "c" that of the series circuit consisting of the high band emphasizing circuit 23 and the low-pass filter LPF3.

The embodiment is thus arranged to change the high band emphasizing frequency and level according to the time base compression rate of the audio signal in such a manner that: The emphasized degree of the high band frequency relative to the low band frequency is increased accordingly as the high band cut-off frequency decreases. With the exception of this, other parts of the arrangement are the same as those shown in FIGS. 4 and 5.

Figure 11:
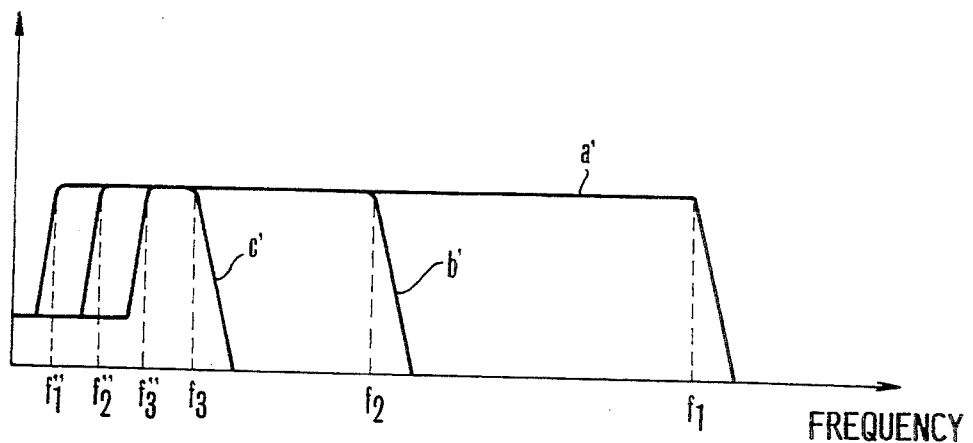

FIG. 10 shows a fourth improved embodiment of the invention. In this case, the band-pass filters BPF1 to BPF3 are replaced respectively with a series circuits each consisting of a combination of a low band suppressing circuit 31, 32 or 33 and a low-pass filter LPF1, LPF2 or LPF3. The frequency characteristics of these series circuits are as shown in FIG. 11. A curve a' shows the characteristic of the series circuit which consists of the low band suppressing circuit 31 and the low-pass filter LPF1 and is to be used for the recording mode of having the smallest time base compression rate of 320 times (recorded sound time of 5 sec/track). In this instance, the high band cut-off frequency is f1, while frequencies below a frequency f1" in the lower band are suppressed. A curve b' shows the characteristic of the series circuit which consists of the low band suppressing circuit 32 and the low-pass filter LPF2 and is to be used for the mode of having the time base compression rate of 640 times (recorded sound time of 10 sec/track). The high band cut-off frequency is f2. Frequencies below a frequency f2" in the low band are suppressed. A curve c' shows the characteristic of the series circuit which consists of the low band suppressing circuit 33 and the low-pass filter LPF3 and is to be used for the mode of having the largest time base compression rate of 1280 times (sound record time of 20 sec/track). The high band cut-off frequency is f3. In the low band, frequencies below a frequency f3" are suppressed. In each of these frequency characteristics, the amplitude characteristic of a low band is suppressed. The lower the high band cut-off frequency, the greater the low-band suppressing range. This arrangement ensures a well-balanced reproduced signal by removing such a disagreeable auditory sensation that the lower the high band cut-off frequency, the greater the emphasized degree of the low band.

Further, with the low band suppressing range arranged to be variable, the suppressing level may be arranged to be also variable. In designing the apparatus, the degree of suppression may be suitably selected according to the auditory sensation. Further, in each of the embodiments described, the filters are arranged to have the same characteristics both for the recording and reproducing systems. However, they may be arranged to have their characteristics set separately for these systems. With respect to the equalizing purpose in terms of sound quality, the same effect can be attained by using them only for one of the systems. Further, in inserting the filters for the purpose of changing the frequency characteristic, each of the embodiments described is arranged to have them before the time base compression and after the time base expansion. However, this arrangement may be changed to insert them after the time base compression and before the time base expansion.

Figure 12:
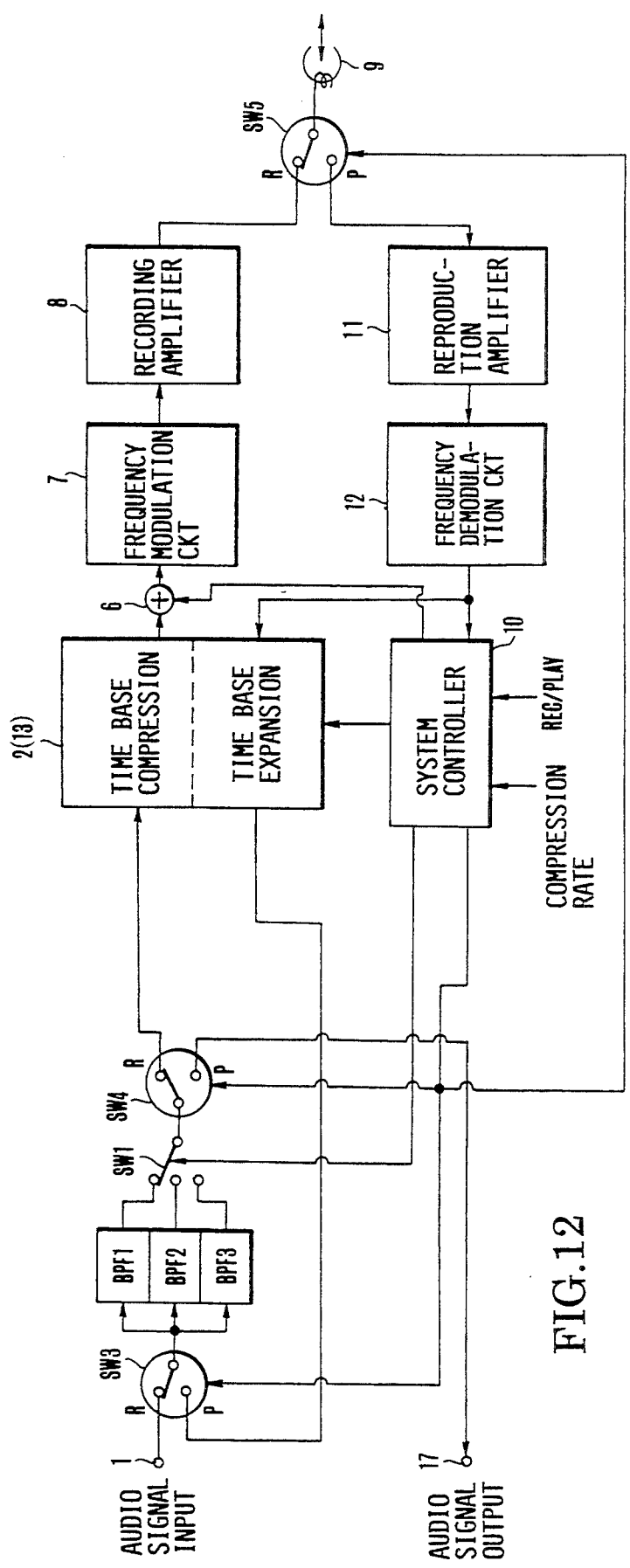
FIG. 12 is a block diagram showing the recording and reproducing arrangement of a signal processing apparatus according to this invention as another embodiment thereof.

In the foregoing, the recording and reproducing systems are illustrated and described separately from each other. In actual application, however, the apparatus may be arranged as shown in FIG. 12. In accordance with this arrangement, the recording and reproducing systems do not have to be separately arranged. In this case, either a recording mode and a reproducing mode is arranged to be selectable by means of an operation button which is not shown. With one of the modes selected, a signal is produced from the system controller to cause recording/reproduction selection switches SW3, SW4 and SW5 to change their switching positions. This embodiment includes time base compressing and expanding circuits which are arranged in the same manner. Both the compressing and expanding actions are arranged to be accomplished by controlling a data reading rate. This arrangement obviates the necessity of arranging the recording and reproducing systems separately from each other. The position of each of the selection switches SW3 to SW5 is on the side of a fixed contact R for recording and on the side of another fixed contact P. The operation of the embodiment is similar to that of the embodiment described in the foregoing and therefore requires no further description. However, the arrangement of this embodiment is of course applicable to any of the foregoing embodiments.

In the foregoing, the invention has been described through each of the embodiments by way of example as being arranged to record an audio signal in a compressed state. However, it goes without saying that the invention is likewise advantageously applicable also to recording an audio signal in a narrow band without compressing it, to transmission of an audio signal in a compressed state and to transmission of an audio signal in a narrow band.

Figure 13:
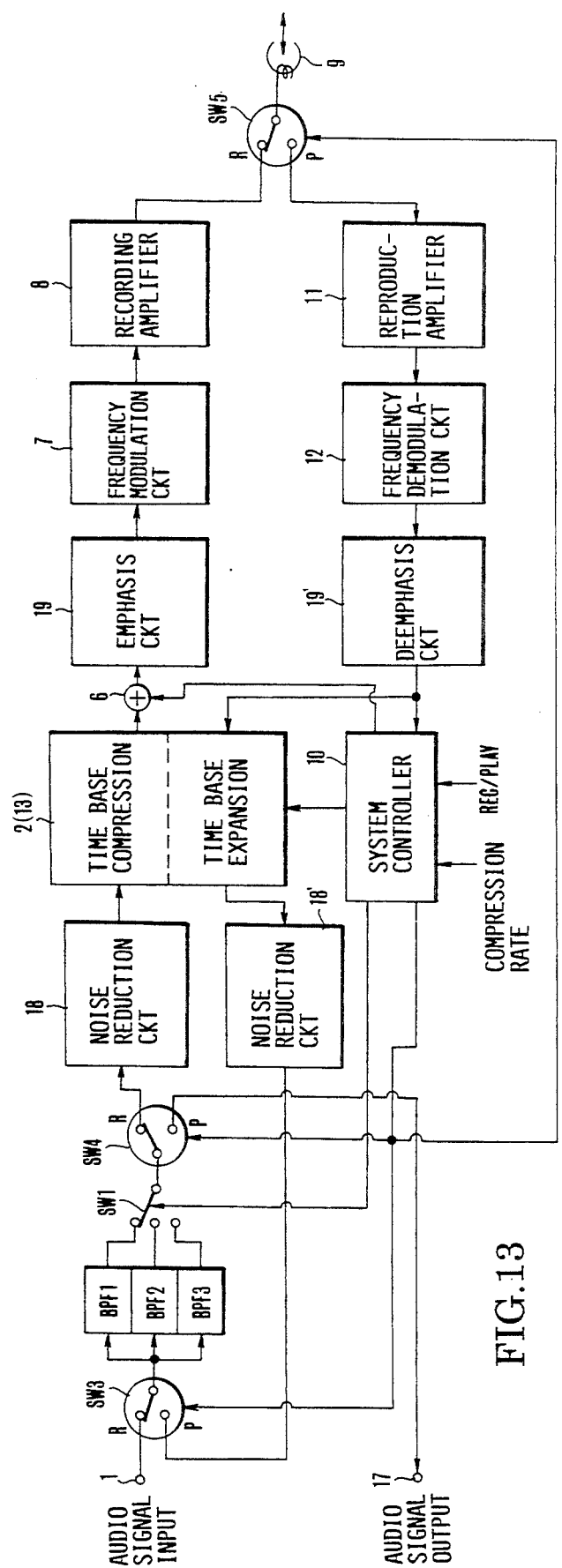
FIG. 13 is a block diagram showing an actual arrangement of recording and reproducing systems.

The foregoing description of the embodiments has covered only the parts which are essentially related to the invention and arranged not only to band limit the frequency characteristic of the audio signal according to the actual recorded-sound time (time base compression rate) but also to limit the low band thereof in consideration of sound quality. However, as shown in FIG. 13, an actual arrangement of recording and reproducing systems according to the invention includes some additional parts. Referring to FIG. 13, the recording system includes a noise reduction circuit 18 which is arranged before the time base compressing block 2 to perform an amplitude compressing action, etc.; and an emphasis circuit 19 which are arranged after the block 2 to perform a high emphasizing action before frequency modulation. The reproducing system includes a deemphasis circuit 19' which is arranged on the output side of the frequency demodulation circuit 12 to have a characteristic reverse to that of the emphasis circuit 19; and a noise reduction circuit 18' which is arranged on the output side of the time base expanding block 13 to have a characteristic reverse to that of the noise reduction circuit 18. Other parts of arrangement are similar to those of the embodiment described in the foregoing.

The signal processing apparatus according to this invention, as described in the foregoing, is arranged to apply a plurality of band limitations to an audio signal before recording it on a recording medium or to reproduce the signal from the medium. The low band frequency characteristic is arranged to be variable according to the plurality of band limitations. Therefore, in the event of a plurality of modes having different time base compression rates, i.e. different frequency bands, for example, the embodiment of the invention is capable of preventing any low-band emphasized audiitory sensation that otherwise results from difference in the frequency characteristic between different modes. The embodiment is, therefore, Capable of reproducing audio signals without giving any unnatural auditory sensation despite of the above stated difference between the plurality of modes.

What is claimed is:

1. A signal processing apparatus comprising:
   a) time base compressing means for compressing a time base of an input signal to output the time-base-compressed signal; and
   b) band limiting means for limiting a frequency band of a signal to be supplied to said time base compressing means, said band limiting means being arranged to control a high band cut-off frequency of the signal according to a time base compressing rate of said time base compressing means before effecting the time base compressing and to change a low band frequency characteristic of the signal according to the high band cut-off frequency.

2. An apparatus according to claim 1, wherein said band limiting means includes a plurality of band-pass filters having different pass bands from each other and is arranged to select one of said filters according to the time base compressing rate.

3. An apparatus according to claim 2, wherein said band-pass filters are set in such a manner that the lower the high band cut-off frequency is, the higher the low band cut-off frequency is.

4. An apparatus according to claim 1 or 3, wherein said band limiting means is arranged to set the high band cut-off frequency at a lower value and the low band cut-off frequency at a higher value accordingly as the time base compressing rate becomes greater.

5. An apparatus according to claim 1, wherein said band limiting means includes a plurality of filter circuits, each of which has a high-pass filter and a low-pass filter which are connected in series, said filter circuits being arranged to have different pass bands from each other.

6. An apparatus according to claim 1, wherein said band limiting means includes a plurality of series connection circuits, each of which has a high band emphasizing circuit and a low-pass filter which are connected in series, said series connection circuits having different frequency characteristics from each other.

7. An apparatus according to claim 1, wherein said band limiting means includes a plurality of series connection circuits, each of which has a low band suppressing circuit and a low-pass filter which are connected in series, said series connection circuits having different frequency characteristics from each other.

8. An apparatus according to claim 6, wherein said band limiting means is arranged to select one of said series connection circuits in such a manner that the greater the time base compressing rate is, the more the high band of the signal is emphasized.

9. An apparatus according to claim 7, wherein said band limiting means is arranged to select one of said series connection circuits in such a manner that the greater the time base compressing rate is, the more the low band of the signal is suppressed.

10. An apparatus according to claim 1, wherein said time base compressing means includes an A/D converting circuit which is arranged to analog-to-digital convert the input signal, a memory which stores the A/D converted signal, and a D/A converting circuit which is arranged to digital-to-analog convert the signal read out from said memory.

11. A recording apparatus comprising:
    a) recording means for recording an input signal on a recording medium by changing a time base of the input signal; and
    b) band limiting means for limiting a frequency band of the input signal before the time base of the input signal is changed, said band limiting means being arranged to limit a high band of cut-off frequency of the input signal and to control the frequency characteristic of a low band of the signal according to the cut-off frequency of the high band.

12. An apparatus according to claim 11, wherein said recording means includes a, time base compression circuit and a frequency modulation circuit which is arranged to frequency modulate a time base compressed signal.

13. An apparatus according to claim 11, wherein said band limiting means includes a plurality of band-pass filters having different pass bands from each other and is arranged to select one of said filters according to the time base compressing rate.

14. An apparatus according to claim 13, wherein said band-pass filters are set in such a manner that the lower the high band cut-off frequency is, the higher the low band cut-off frequency is.

15. An apparatus according to claim 11 or 14, wherein said band limiting means is arranged to set the high band cut-off frequency at a lower value and the low band cut-off frequency at a higher value accordingly as the time base compressing rate becomes greater.

16. An apparatus according to claim 11, wherein said band limiting means includes a plurality of filter circuits, each of which has a high-pass filter and a low-pass filter which are connected in series, said filter circuits being arranged to have different pass bands from each other.

17. An apparatus according to claim 11, wherein said band limiting means includes a plurality of series connection circuits, each of which has a high band emphasizing circuit and a low-pass filter which are connected in series, said series connection circuits having different frequency characteristics from each other.

18. An apparatus according to claim 11, wherein said band limiting means includes a plurality of series connection circuits, each of which has a low band suppressing circuit and a low-pass filter which are connected in series, said series connection circuits having different frequency characteristics from each other.

19. An apparatus according to claim 17, wherein said band limiting means is arranged to select one of said series connection circuits in such a manner that the greater the time base compressing rate is, the more the high band of the signal is emphasized.

20. An apparatus according to claim 18, wherein said band limiting means is arranged to select one of said series connection circuits in such a manner that the greater the time base compressing rate is, the more the low band of the signal is suppressed.

21. A reproducing apparatus comprising:

a) reproducing means for reproducing a recorded signal recorded on a recording medium in a state of having the time base thereof compressed at a given compression rate;

b) time base expanding means for expanding the time base of the signal at an expansion rate corresponding to the time base compression rate of the recorded signal reproduced by said reproducing means; and c) band limiting means for limiting a frequency band of the signal time-base-expanded by said time base expanding means, said band limiting means being arranged to change a high band cut-off frequency of the signal according to the expansion rate of said time base expanding means and to control a frequency suppression of a low band of the signal according to the high band cut-off frequency.

22. An apparatus according to claim 21, wherein said recorded signal is recorded on the recording medium in a frequency modulated state, and wherein said reproducing means includes a frequency demodulation circuit which frequency-demodulates a reproduced signal obtained by reproducing said recorded signal from said recording medium and a time base expanding circuit which expands a time base of the demodulated reproduced signal.

23. An apparatus according to claim 21, wherein said band limiting means includes a plurality of band-pass filters of different pass bands and is arranged to select one of said band-pass filters according to the time base compressing rate, and wherein said plurality of band-pass filters are arranged such that the lower the high band cut-off frequency thereof, the higher the low band cut-off frequency thereof is.

24. An apparatus according to claim 21, wherein said band limiting means includes a plurality of filter circuits, each of which has a high-pass filter and a low-pass filter which are connected in series, said filter circuits being arranged to have different pass bands from each other.

25. An apparatus according to claim 21, wherein said band limiting means includes a plurality of series connection circuits, each of which has a high band emphasizing circuit and a low-pass filter, said series connection circuits having different frequency characteristics from each other, and wherein one of said plurality of series connection circuits is selected in such a manner that the larger the time base compressing rate is, the more the high band of the signal is emphasized.

26. An apparatus according to claim 21 wherein said band limiting means includes a plurality of series connection circuits, each of which has a low band suppressing circuit and a low-pass filter, said series connection circuits having different frequency characteristics from each other, and wherein one of said plurality of series connection circuits is selected in such a manner that the larger the time base compressing rate is, the more the low band of the signal is suppressed.

27. A signal processing apparatus comprising:

a) sampling means for sampling an input signal at a given frequency; and b) band limiting means for limiting a frequency band of the input signal according to the sampling frequency of said sampling means, said band limiting means being arranged to limit a high band cut-off frequency of the input signal before effecting the sampling according to the sampling frequency and to control a frequency suppression of a low band of the signal according to the high band cut-off frequency.

28. An apparatus according to claim 27, wherein said band limiting means includes a plurality of band-pass filters of different pass bands and is arranged to select one of said band-pass filters according to the time base compressing rate, and wherein said plurality of band-pass filters are arranged such that the lower the high band cut-off frequency thereof, the higher the low band cut-off frequency thereof is.

29. An apparatus according to claim 27, wherein said band limiting means includes a plurality of filter circuits, each of which has a high-pass filter and low-pass filter which are connected in series, said filter circuits being arranged to have different pass bands from each other.

30. An apparatus according to claim 27, wherein said band limiting means includes a plurality of series connection circuits, each of which has a high band emphasizing circuit and a low-pass filter, said series connection circuits having different frequency characteristics from each other, and wherein one of said plurality of series connection circuits is selected in such a manner that the larger the time base compressing rate is, the more the high band of the signal is emphasized.

31. A signal recording and reproducing apparatus comprising:

a) recording means for recording an input signal on a recording medium by compressing a time base of the input signal before recording;

b) reproducing means for reproducing the signal recorded on said recording medium, said reproducing means being arranged to output the reproduced signal after expanding the time base of the reproduced signal; and c) characteristic control means for controlling a low band frequency suppression of at least one of the input signal before said time base compression and the output signal after said time base expansion according to the rate of said time base compression.

32. An apparatus according to claim 31, wherein said band limiting means includes a plurality of band-pass filters of different pass bands and is arranged to select one of said band-pass filters according to the time base compressing rate, and wherein said plurality of band-pass filters are arranged such that the lower the high band cut-off frequency thereof, the higher the low band cut-off frequency thereof is.

33. An apparatus according to claim 31, wherein said band limiting means includes a plurality of filter circuits, each of which has a high-pass filter and a low-pass filter which are connected in series, said filter circuits being arranged to have different pass bands from each other.

34. An apparatus according to claim 31, wherein said band limiting means includes a plurality of series connection circuits, each of which has a high band emphasizing circuit and a low-pass filter, said series connection circuits having different frequency characteristics from each other, and wherein one of said plurality of series connection circuits is selected in such a manner that the larger the time base compressing rate is, the more the high band of the signal is emphasized.

35. An apparatus according to claim 31, wherein said band limiting means includes a plurality of series connection circuits, each of which has a low band suppressing circuit and a low-pass filter, said series connection circuits having different frequency characteristics from each other, and wherein one of said plurality of series connection circuits is selected in such a manner that the larger the time base compressing rate is, the more the low band of the signal is suppressed.

* * * * *